April 30, 1968   F. FUIS, JR., ET AL   3,380,460
TOBACCO STRIPPERS AND/OR GRADERS
Filed Oct. 5, 1965   6 Sheets-Sheet 2
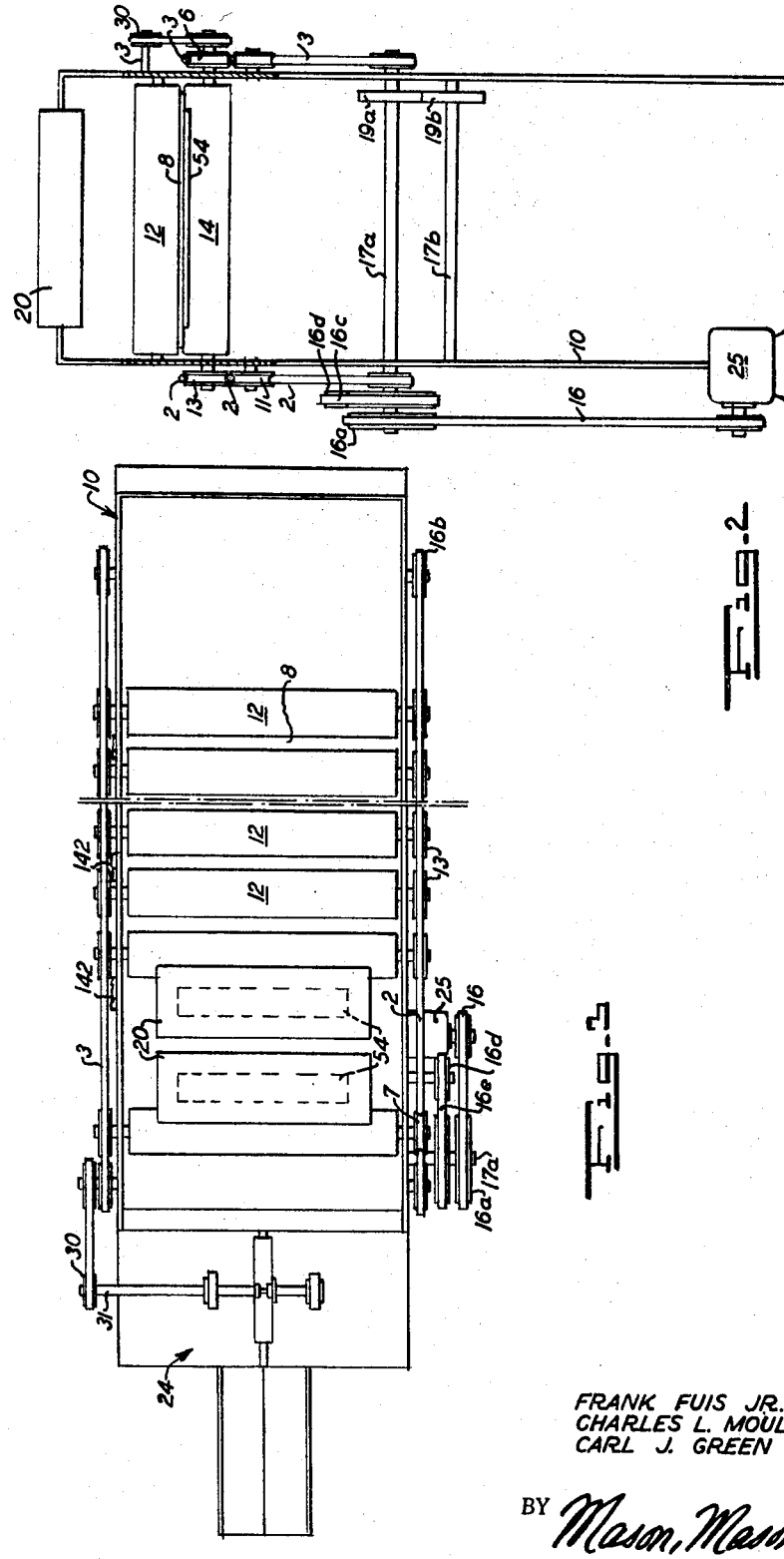
INVENTORS
FRANK FUIS JR.
CHARLES L. MOULTON
CARL J. GREEN
BY Mason, Mason & Albright
ATTORNEYS April 30, 1968  F. FUIS, JR., ETAL  3,380,460
TOBACCO STRIPPERS AND/OR GRADERS
Filed Oct. 5, 1965  6 Sheets-Sheet 3
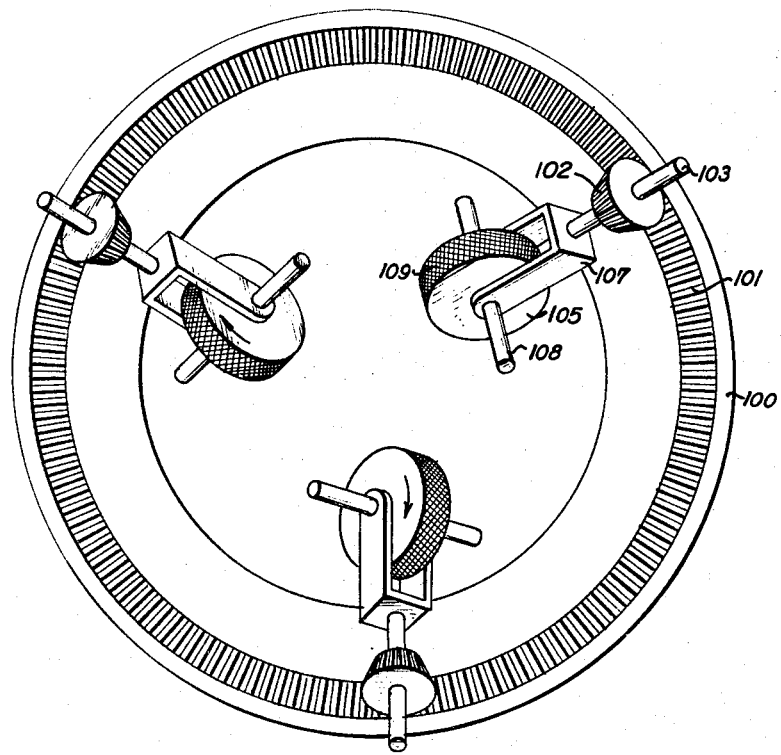
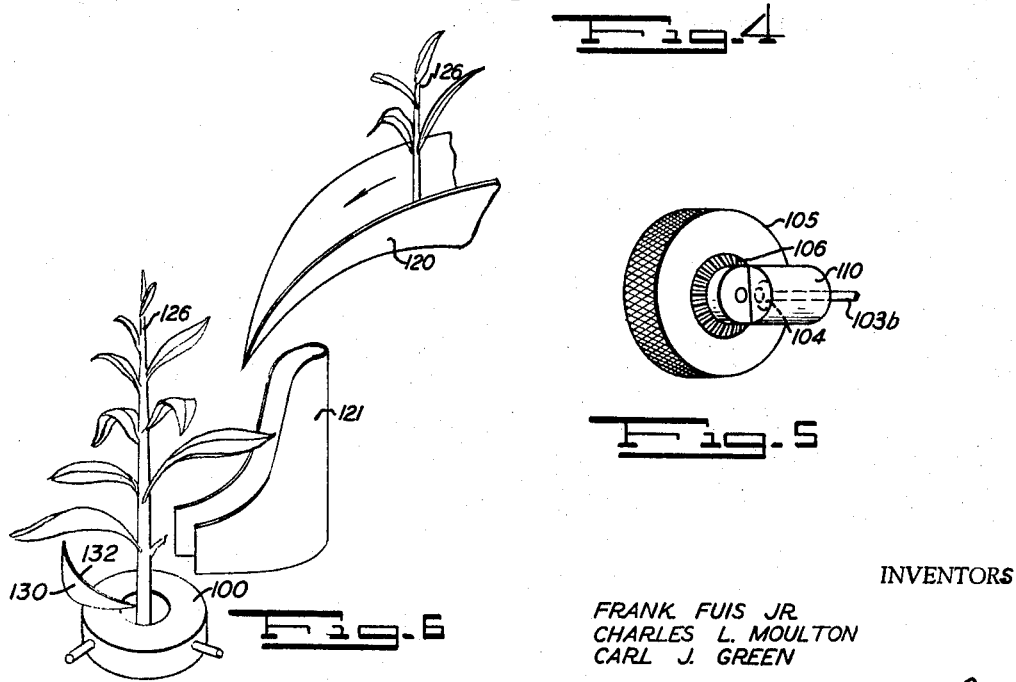
INVENTORS
FRANK FUIS JR.
CHARLES L. MOULTON
CARL J. GREEN
BY Mason, Mason & Albright
ATTORNEYS

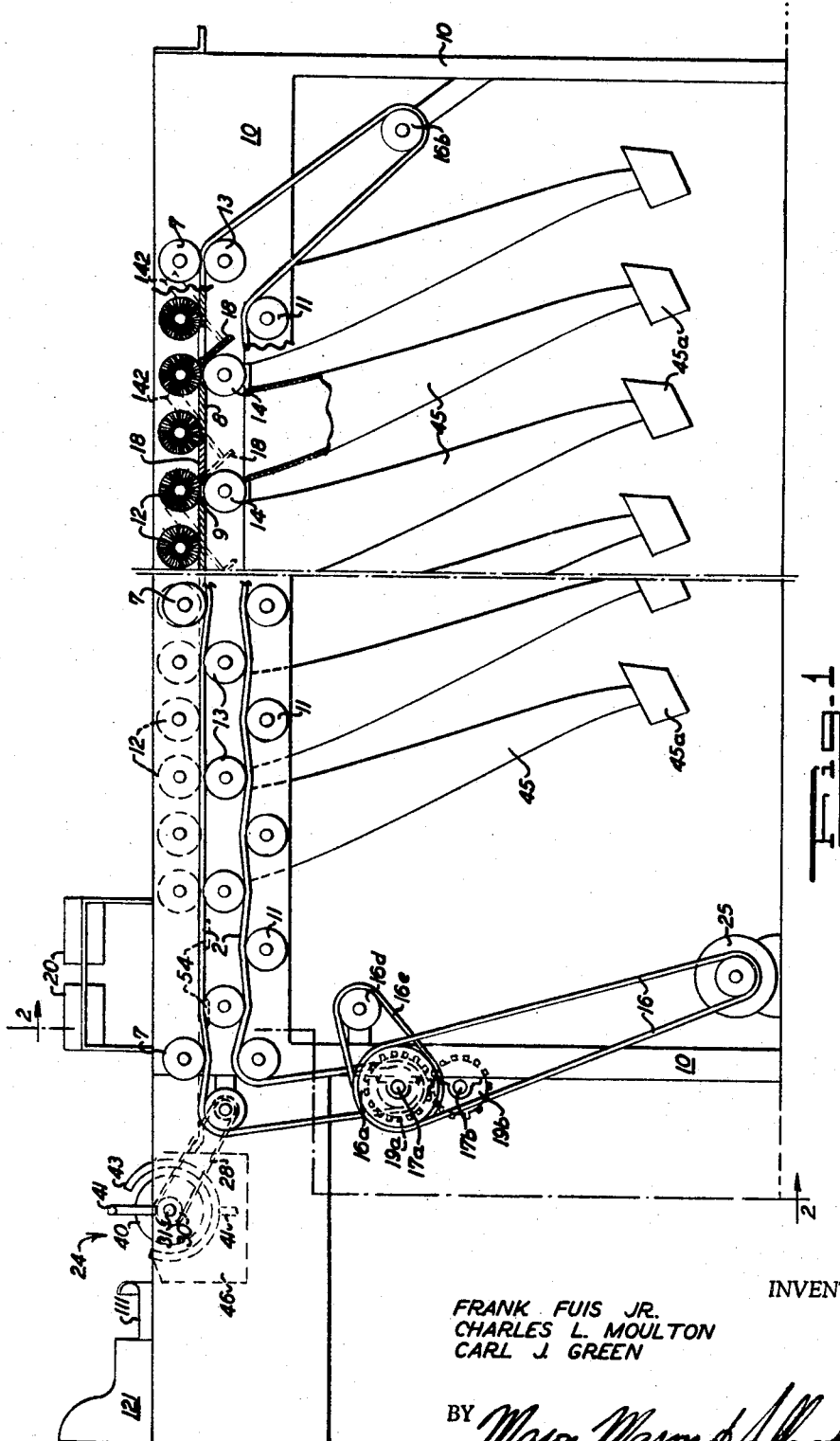

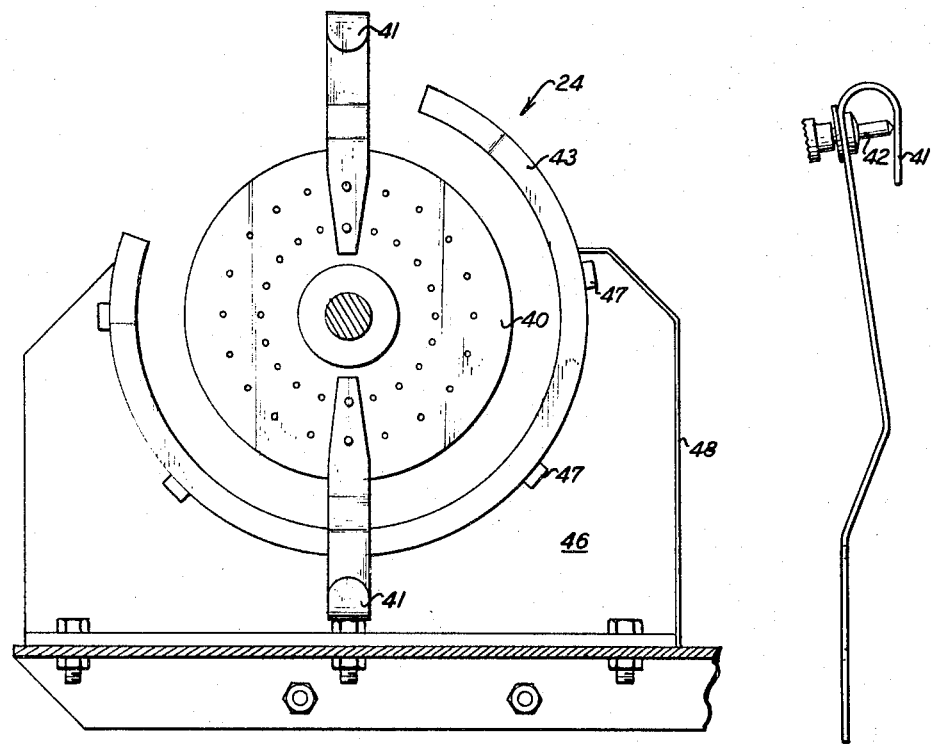
Fig-7
Fig-9
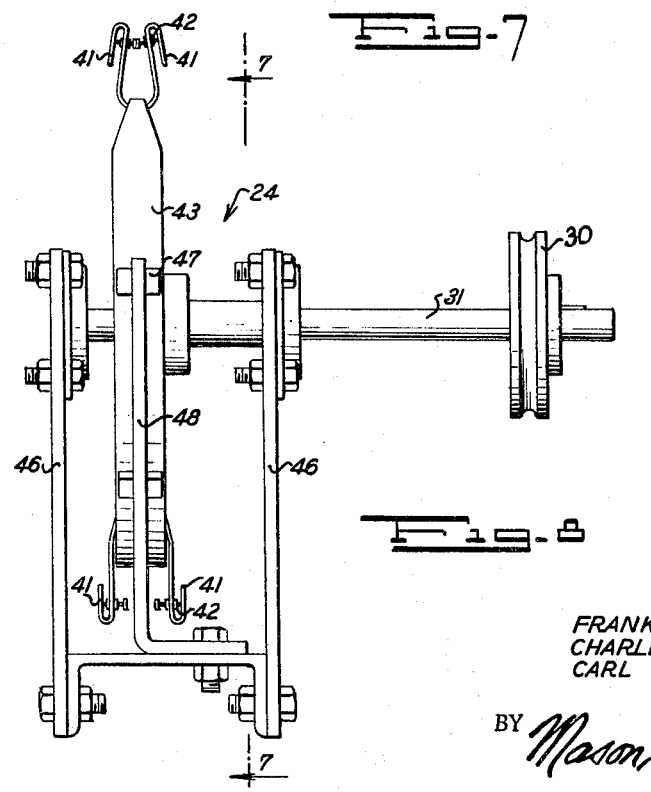
Fig-8
INVENTORS
FRANK FUIS JR.
CHARLES L. MOULTON
CARL J. GREEN

INVENTORS
FRANK FUIS JR.
CHARLES L. MOULTON
CARL J. GREEN

United States Patent Office 3,380,460
Patented Apr. 30, 1968

3,380,460
TOBACCO STRIPPERS AND/OR GRADERS
Frank Fuis, Jr., Norris, and Charles L. Moulton and Carl
J. Green, Knoxville, Tenn., assignors to True-Grade,
Incorporated, Oak Ridge, Tenn.,
Filed Oct. 5, 1965, Ser. No. 493,043
11 Claims. (Cl. 131—131)

ABSTRACT OF THE DISCLOSURE

This tobacco grading apparatus has a mechanism for delivering individual tobacco leaves to a roller conveyor mounted on a horizontal surface with one or more exit gates intervening between the rollers. At the entrance to the conveyor there is a light sensitive device which records the color of the leaves and triggers the appropriate gate so that a conveyed tobacco leaf can be exited to a collector positioned under the gate. The mechanism for delivering tobacco leaves can be a stripper which severs the leaves from the stalk. The stripper includes a rotary chuck with a stationary knife that severs the tobacco leaves as the stalk is drawn through the chuck.

---

The invention relates to a grading apparatus for leaf and sheet material. More particularly, the apparatus of the present invention is designed to completely process the grading of tobacco leaves. Thus, the steps of removing the leaves from the stalk, classifying same and collecting the graded leaves can all be handled with the apparatus described herein. In sequence, the leaf hopper component of the apparatus described herein automatically dispenses leaves to a gripping mechanism which feeds the leaves individually to a conveyor. The leaves are then moved at a predetermined speed across a grading area where the leaves are graded and measured. Thereafter, the leaves pass through the appropriate gates to collectors. The processing of leaves is accomplished from start to finish without the need of any manual handling.

The apparatus of the instant invention is an improvement and represents technological advancement made to the device disclosed in Patent 2,574,030 since the date of issuance.

Accordingly, it is an object of the present invention to provide a mechanism that can rapidly dispense individual tobacco leaves and feed same across a grading area designed to fully measure the characteristics necessary to properly grade the leaves.

It is another object to provide a mechanism that can automatically sever tobacco leaves from a stalk and feed the individual leaves to a conveyor for grading.

It is a further object to provide a grading mechanism that can sense the characteristics of moving leaves and trigger open the appropriate gates to collect graded leaves in groups having common characteristics.

It is a still further object to provide a mechanism that can accomplish the above using a substantially flat, preferably horizontal, surface for both the grading area and gates whereby the individual leaves are moved across the aforementioned surface by the conveyor.

These and other objects will be apparent from the following description, taken in conjunction with the accompanying drawings showing only preferred and specific embodiments of the invention wherein:

FIGURE 1 is a side elevational view of the conveyor-grader assembly with a dispensing means including a stalk cutter;

FIGURE 2 is a sectional view thereof taken on lines 2—2 of FIGURE 1;

FIGURE 3 is a top plan view of the same conveyor-grader without the stalk stripper but with a chute dispensing means;

FIGURE 4 is a partial top plan view of the stripper chuck and gripper wheels;

FIGURE 5 is a side elevation of one of the gripper wheels;

FIGURE 6 is a side elevation of the tobacco stripper assembled with cover in place to receive a tobacco stalk;

FIGURE 7 is a side elevation of the gripping mechanism;

FIGURE 8 is a rear elevation of the gripping mechanism;

FIGURE 9 is a side elevation of one of the fingers with nail tip;

Figure 12:
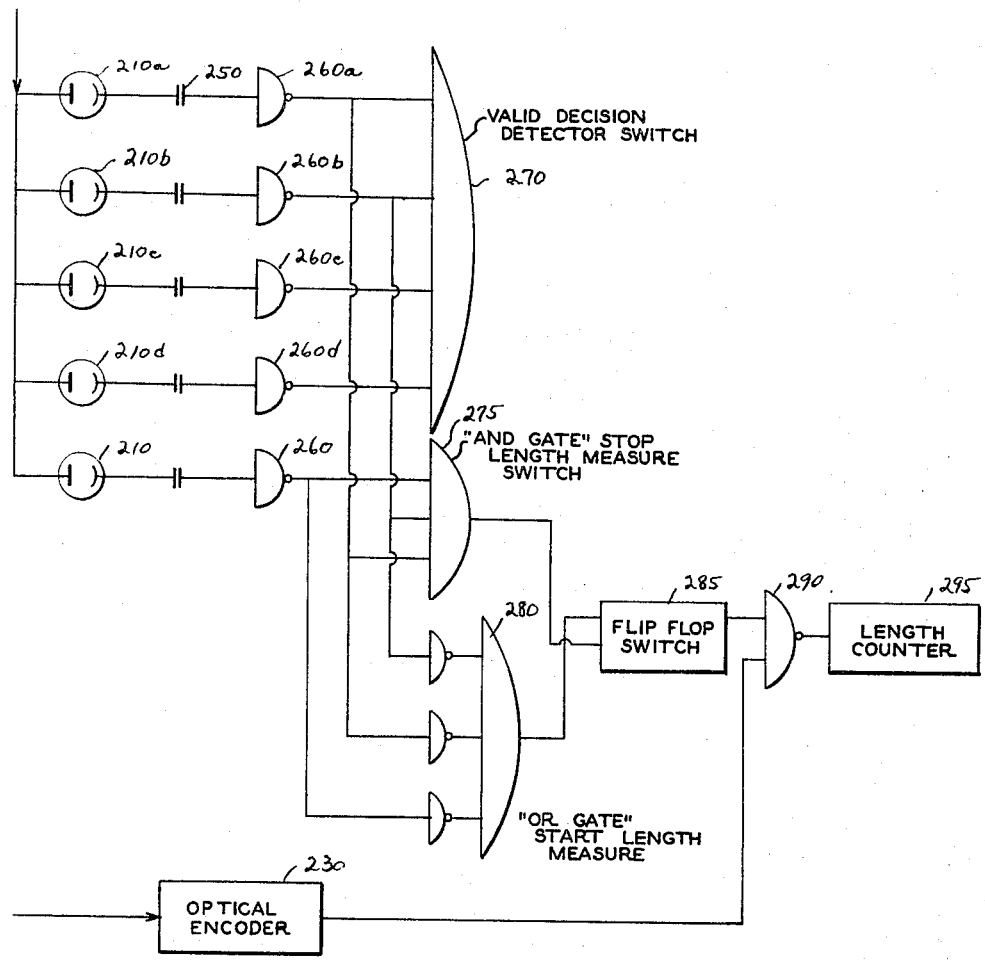
Figure 13:
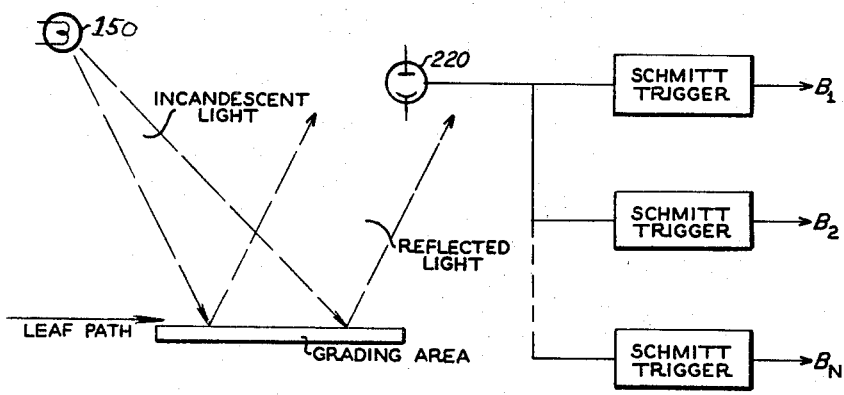
Figure 14:
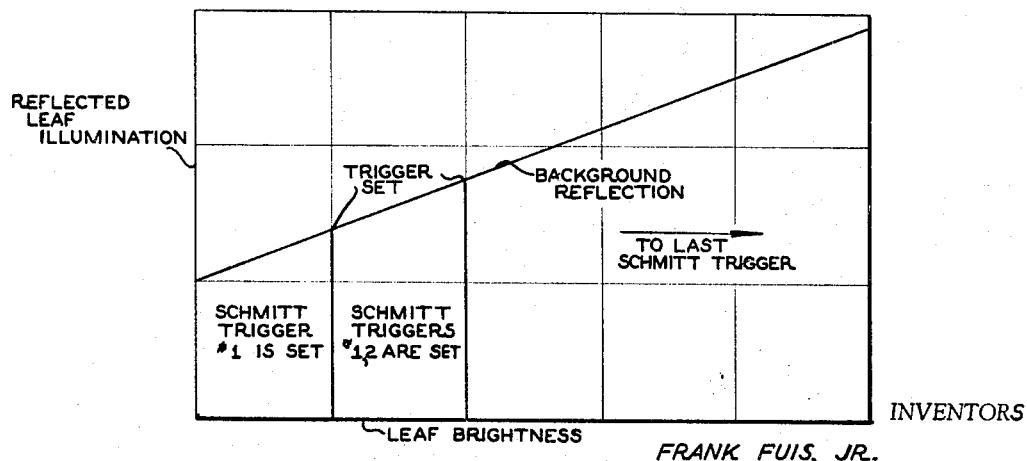

FIGURE 12 schematically shows the circuitry of the grading device;

FIGURE 13 schematically shows the means for measuring the color of the leaf; and FIGURE 14 schematically illustrates the brightness spectrum for Schmitt Triggers.

As seen in FIGURE 1, the grader assembly includes an upright frame support 10 with a series of upper conveyor rollers 12 and lower conveyor rollers 14 rotated by belts 3 and 2, respectively, arranged to be driven. Upper cylindrical rollers 12 are preferably nylon brush rollers, each of which has a drive pulley 6 on one side to receive endless belt 3 and several of the rollers 12 are provided with pulleys 7 on the opposite side of the mechanism. These pulleys 7 act as idler or guide pulleys for the belt 2 which drives the lower rollers 14. Rollers 12 are positioned immediately above the flat surface 8 of the apparatus. Lower cylindrical rollers 14 can be comprised of nylon brushes similar to rollers 12 but are preferably comprised of a corrosion resistant metal such as aluminum. These rollers 14 are positioned medially below the surface 8 to protrude in part through slits 9 in the surface approximately opposite the surfaces of rollers 12. An endless belt 2 rotates drive pulleys 13, with idler pulleys 7 and 11 guiding the belt 2 above and below pulleys 11. Belt 16 from motor 25 turns pulley 16a which, in turn, rotates shafts 17a which, in turn, rotates gears 19a and 19b to turn shaft 17b journalled in the frame support 10. Pulleys 16a and 16d are also journalled in frame support 10 as shown in FIG. 1. A short endless belt 16e connects pulleys 16a and 16d.

In operation, leaves are fed to rollers 12 and 14 which are rotated at high rates of speed to grip the tobacco leaves and propel the leaves across the flat surface 8. Surface 8 houses a plurality of successive hinged gates 18 which are normally closed. The upper and lower rollers 12 and 14 are located to oppose one another's surfaces slightly above surface 8 and between gates 18. If the rollers are brushes, they serve to straighten the leaves and remove dirt and dust without tearing or injuring the leaves. A leaf gripping mechanism 24 is synchronized with the conveyor, preferably directly as shown, so as to time the entry of the individual leaves into the conveyor rolls. Thus, overlapping of leaves is prevented and one leaf at a time is fed to the rolls.

The gripping mechanism 24 is a rotary device which includes a disc 40 rotatably mounted on shaft 31 to which a plurality of paired spring fingers 41 are attached in opposing relationship. As seen in FIGURES 7-9, each finger is a curved piece of metal bent over at its end. At the bent-over end, each finger is tipped with a nail 42. Opposing nails 42 comprise contact points at the gripper's outer extremity. The fingers are actuated by a fixed spreader ring 43 which divides each pair of fingers so that during rotation of the disc, the ring holds the fingers apart. As the disc rotates, the fingers snap together upon reaching the gap in the upper portion of the ring adjacent the hopper.

As seen in FIGURE 8, shaft 31 is rotated through pulley 30. The disc 40 is secured to shaft 31 which is journalled to bracket 46. Bracket 46 also holds spreader ring 43 which is supported on cleats 47 and a circular strip support 48 bolted to bracket 46.

Upon snapping shut the fingers grip a leaf at the base of its stem so that this part of the leaf, because of inertia and air resistance, is moved in a direction perpendicular to the receiving pair of rollers of the conveyor. At a point in the approaching movement of the held leaf towards the conveyor, the fingers are again spread apart by the spreader ring and centrifugal force will then dispatch the leaf dart-like and stem end first toward the conveyor rollers.

As each stalk is received from a chute in chuck 100, (FIG. 6), it is rotated and drawn through the rotary chuck. A leaf-orienting device in the form of a curved shield 121 confines the leaves so that as the leaves are severed, the stem end portions of the leaves face the conveyor.

The shield is curved towards the stationary knife 130 so that a rotating leaf is gradually and progressively oriented stem end first. A brush (not shown) can be positioned on the cover of the chuck immediately adjacent and about half way between the knife and the forward end of the shield to insure that the leaf is correctly urged towards the conveyors.

If the leaves are already severed as received, they can be fed from the leaf hopper through the leaf gripper, stem end first, directly to the conveyor rollers 12 and 14.

A series of flutter gates 18 is located along the surface. Each gate is hinged to the support frame 10 to open and shut as its corresponding solenoid is signalled. Solenoids 142 are bolted to frame support 10 along side their corresponding gates. Directly beneath each gate is a chute 45 which has a collection pan 45a at the bottom thereof.

As the individual leaves are passed through electronic grader 20, they are scanned and measured, then graded and collected. Initially, the leaves moving through the conveyor are measured and then are conveyed across the surface fitted with flutter gates 18. Depending on the signals given to the solenoids 142, the leaves pass through one of the triggered gates and then down through one of the chutes 45 to be bunched. Leaves of various grades pass along over closed gate pans to other pans carrying gates receptive to the signal given for their individual respective grades. As many grades as desired can be separated from the tobacco crop simply by adding additional sensing devices, rollers, pans, gates, etc. to accommodate the additional grades.

The rollers are rotated at controlled rates of speed so that for forty leaves per second, for example, the conveying speed can be 120 feet per second to prevent any overlapping of leaves.

The leaves passing down through the chutes 45 are oriented by the curved form of the chutes and collected into "hands" as the leaves move downward so that at the bottom of the individual chutes the leaves are stacked upon one another with their stem ends in even alignment in pans 45a. After a predetermined amount of leaves has been accumulated, say one pound, a weighing device triggers an ejecting mechanism (not shown) to move the hands out of the chutes. Preferably each chute is provided with an automatic tying unit which binds each weighed hand with the appropriate tying material, usually a tobacco cord. Alternatively, the hands can be tied and/or ejected by the mechanism which is triggered by the number of times the gate has been opened.

Should a leaf not fit into any grade set up by the operator due to unusual charcateristics or because a leaf is improperly graded, the leaf is directed as a "no-decision leaf" to a collector (not shown) so that it and other similarly graded leaves can be manually classified.

In the event a leaf is propelled into the grading area before the previous leaf is fully processed, buffer storage flip flops follow the logic gates. The transfer from buffer to an active gate is accomplished by a signal derived from the trailing edge of a leaf. This signal can also function to turn on a "jam" light should it fail to operate in a predetermined period of time. Preceding the gripping mechanism is a dispensing means which is a leaf hopper that funnels individual leaves to the leaf gripper as shown in FIGURE 2, or a leaf stripper as shown in FIGURES 4-6.

The tobacco stalk stripper shown partially in detail in FIGURES 4-6 comprises a rotary chuck 100 with a gear strip 101 around its inner periphery and a plurality, three or more, of gear wheels 102 which are operatively associated with the gear strip. The chuck wheels 105 are rotated by gear and motor means (not shown) positioned on the side of chuck 100 or may be driven by flexible shafts from a common power source, said flexible shafts fixed directly to shafts 108 or to shafts 103b arranged to drive wheel through bevel gearing 104 and 106 as in FIGURE 5.

Each wheel mount includes a shaft 103; a bevel gear is mounted to hold and to set to various angles the wheel assembly mounts 107. Wheel 105 is provided with a cross-threaded friction surface 109 and is rotatable about axle 108 held by bifurcated element 107. In operation, the stripper includes a cover 111 for chuck 100 and the shafts. Also, the bifurcated elements of wheels 105 are preferably sheathed in a sleeve 110. To assure gripping various diameters of stalk, two of the wheels are moved radially towards the third fixed wheel and a leaf-cutting knife 130, fixed or rotary, is held near the fixed wheel. Knife 130 preferably comprises a flat planar blade fixedly disposed tangentially to one of the fixed wheels 105. The knife cutting edge 132 is thus exposed in cutting relation to tobacco leaves as they are advanced by the rotating motion of the plant's stalk by and through rotary chuck 100. Advancement of a stalk carries each leaf past knife 130 and results in a shearing of the leaf from the stalk. All wheels are held so that they can be turned simultaneously to desired angles by rotating sleeve 110 in a housing (not shown) through ring gear 101. The wheels are normally held in such positions by sleeve 110, ring gear 101, and cover 111. A stalk of tobacco 126 engaged by these wheels will be urged downwardly and, at the same time, because of angle setting of wheels, turned as the stalk is drawn through the chuck.

It will be appreciated that the stripper can be used to handle burley tobacco and other varieties which are cured on the stalk. In the instant invention, leaves that are not cured on the stalk are placed directly in a chute and dispensed to the grader assembly through the leaf gripper.

As shown in FIGURE 6, a conveyor 120 moves tobacco stalks 126 and moves same at a predetermined rate of speed and feeds the stalks into the chuck of stripper held horizontally. A leaf-orienting device 121, which can include rotating brushes, insures that the leaves will leave the knife with the stems pointed in the direction of travel. Leaves are moved away from the stripper, stem end first, via a hopper and/or a leaf feeder not shown.

Grader 20 is designed to measure the dimensions and characteristics of each leaf with the aid of photoelectric elements. Transparent areas 54 horizontally disposed in the path of the conveyed leaves allow photoelectric cells 53 to measure length and width of each passing leaf. A source of light positioned above the conveyor rolls and transparent area throws light on the photoelectric cells which operate to feed information into saturating amplifiers. An individual amplifier is set in a saturated state if its corresponding photocell is not covered by a passing leaf. The amplifier is in a turned off or unsaturated state if the leaf blocks the illumination from the light source positioned above the grading area. In determining the dimensions of the leaves, a measurement will be started when any of the photoelectric cells are covered and discontinued when none of the cells is covered. During measurement, electrical pulses from an optical encoder geared to the drive mechanism is entered into a binary register, the gearing can be such that normally one pulse per inch of linear travel is produced. The contents of the binary register then indicates the length of the leaf.

Figure 10:
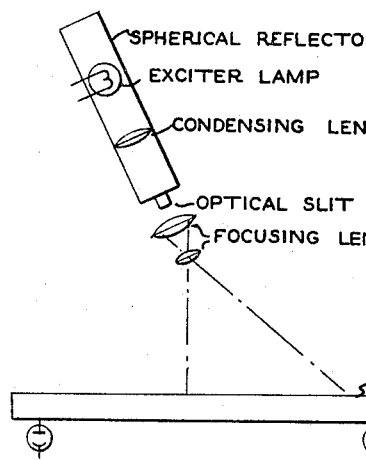
FIGURE 10 is a schematic view of the grading area showing a source of light projecting on a transparent sheet.
Figure 11:
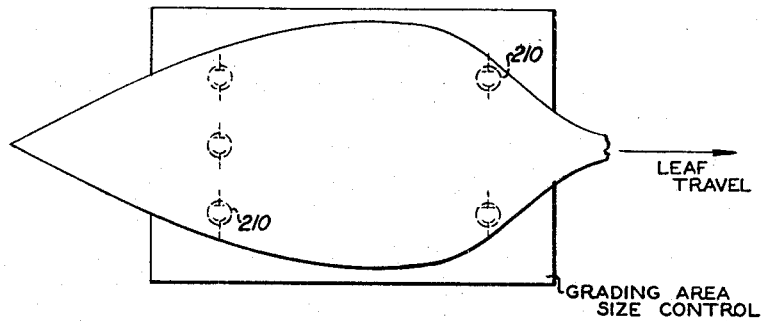
FIGURE 11 is a schematic top plan view of the grading area showing the linear measuring means.

The leaves enter the grading area from mechanism 24 stem end first and at a substantially constant velocity and are moved linearly through the conveyor rolls and across the gate pans. In FIGURE 10, grader 20 includes an exciter lamp 201 that normally projects light down on the grading area including transparent screen 54. The output of lamp 201 is collected and collimated by a spherical reflector 202 and condenser lens 203. The collimated beam of the light is directed through a slit 204 and focusing lens 206 to provide an evenly illuminated area. Under transparent screen 54 a plurality of photocells 210 are arranged perpendicularly to the direction of travel of the leaves as shown in FIGURE 11.

Photocells 210 operate into saturating amplifiers so that an amplifier is in a saturated state if its corresponding photocell is not covered by a leaf. The amplifier is turned off or in an unsaturated state if the leaf is blocking the illumination from the lamp above. A measurement is triggered when any number of the photocells are covered and stopped when all photocells are covered. During the measurement time, electrical pulses from an optical encoder geared to the drive mechanism are entered into a binary register with the gearing being such that one pulse per linear unit, an inch for instance, is produced. The contents of the binary register indicates the length of a leaf. FIGURE 12 shows a layout of the system and the length and width of each leaf are thus measured. FIGURE 12 illustrates the electronic circuitry which quantitizes the tobacco leaf parameters. This information is used to make a "grade decision" which results in opening a gate at the proper time and to provide other timing signals as may be required. The leaf being measured, as seen in FIG. 11, covers some or all of the photoelectric cells 210, 210a, 210b, 210c and 210d which, in turn, turns on the flip flop switch 285 through the "or gate" switch 280 to start the length measurement. The length is measured by counting the number of electrical impulses produced by the optical encoder 230, a pulse generator, which is geared to the roller brushes so that each inch of linear leaf travel is represented by one impulse. The length measurement ends when all photoelectric cells in the front, 210c and 210d, are uncovered and the "and gate" switch 275 turns the flip flop switch 285 off. The length counter 295 will at that time contain a number equal to the length of the leaf in inches.

When and if the leaf covers the corner photoelectric cells 210a, 210b, 210c and 210d, the valid decision detector 270 records the event. At this time, the parameter measuring circuits, such as the brightness and hue circuits (which depend on an established minimum surface area for measuring) will have sufficient leaf surface to measure same accurately. Should the valid decision detector not receive the correct signals from the photoelectric cells, then the leaf is conveyed to the ungraded bin 85.

Each photoelectric cell circuit includes a capacitor 250 to eliminate noise and pick-up. The capacitor is optional and is included as standard equipment. Also, each photoelectric circuit includes electronic switches 260 and 260a, 260c, and 260d which are turned on if the corresponding photoelectric cell has sufficient incident light. The valid decision detector switch 270 can be called an "and gate" and is turned on only if all inputs or switches 260a, 260b, 260c, 260d, are turned on. The stop length measure switch 275 is an "and gate" whereas the start measure length switch 280 is an "or gate." When photoelectric cells 210, 210a or 210b are activated, the switch 280 turns on the flip flop 285 which, in turn, feeds to the "and gate" switch 290 so that impulses from the optical encoder 230 are counted by the binary counter 295. The flip flop 285 remains in an on condition until turned off by the "and gate" switch 275, which, in turn, stops the binary counter 295 through the "and gate" 290.

The brightness of each leaf is measured by gathering and quantitizing the reflected light from the individual leaves. As illustrated in FIGURES 13 and 14, the light from lamp 150 is reflected and a photoelectric cell 220 is placed above the grading area to collect the reflected light and to produce an output voltage proportional to the collected light. The voltage is fed to a series of Schmitt triggers each of which has a preset triggering level to quantitize the photocell output. The hue of each leaf is also measured by the reflected light by means of photocell 220 with a linear spectral response in the green to red region. The voltage output of the protocell is proportional to the frequency of the reflected light and, accordingly, the hue of each leaf is measured. Quantitizing is accomplished with Schmitt triggers as seen in FIGURES 15 and 16. The Schmitt triggers are set so that when the input voltages received from the photoelectric cells exceed the set level, this information is fed to a standard digital computer circuit to release the appropriate gate.

If a leaf, say sixteen inches long and of a certain color, is passed under the source of light at the forward end of the conveyor, the photocell and Schmitt trigger combinations feed information about the length and color of the leaf to a computer circuit, specifically to an "and gate" in the computer. The information gathering circuits quantitize the leaf parameters, as set forth above, then logical circuitry combines the quantitized signals to detect the particular grade and release the appropriate gate.

The photoelectric cells can be the cadmium sulfide type, the resistance of which varies with the amount and spectral content of incident light or the silicon solar cell, the voltage output and internal resistance of which vary with the amount of incident light. Also, a vacuum phototube can be used in which the current conduction varies linearly with the amount of incident light and varies in a band pass fusion with spectral content.

Similarly, the thickness of each leaf is measured by the amount of light passing through to a photocell and only one photocell is needed to measure each the hue of a leaf and the thickness thereof.

It is to be understood that the individual photocells, Schmitt triggers, flip-flops, gates, solenoids and other components in the system are standard and no claim is made to these elements per se.

It will also be appreciated that numerous modifications will suggest themselves to one skilled in the art. For instance, it is possible to drive the rollers from only one side, to accomplish separation based only on brightness alone, to provide only several gates, to use stepping motors for actuating the gates so that the gate activation rate can be raised, to omit some of the rollers and provide other changes. These and other modifications are intended to be included as embodiments of the instant invention.

We claim:

1. An apparatus comprising means for dispensing leaves to a gripping mechanism for feeding individual tobacco leaves stem end first to a roller conveyor, a substantially flat surface associated with said conveyor, constituting an assembly and including a grading area and a plurality of normally closed gates on said surface, said grading area including a plurality of light sensitive selector means for opening said gates for the passage of selected leaves responsive to the characteristics measured by said selector means, and collectors below said gates to receive the deposited leaves.

2. The invention of claim 1 wherein the gripping mechanism includes a substantially vertical rotatable disc having a plurality of opposing fingers mounted thereon for gripping tobacco leaves and means for spreading said fingers to release the leaves held between said fingers as said disc is rotated.

3. The invention of claim 2 wherein said spreading means is a ring segment secured in fixed position between said opposing fingers.

4. The invention of claim 2 wherein the movements of the conveyor and the rotatable disc are synchronized to the same source of power.

5. The invention of claim 1 wherein the conveyor is comprised of a plurality of driven rollers arranged above and below said surface and a plurality of openings are provided in said surface whereby said rollers protrude through said surface to engage said leaves.

6. The invention of claim 1 wherein the dispensing means includes a stalk stripper, said stripper having a rotary chuck for receiving a stalk, means for rotating and advancing the stalks in said chuck and a stationary knife for severing the leaves.

7. The invention of claim 6 wherein a leaf orienting device is positioned adjacent said knife.

8. The invention of claim 6 wherein the stripper has a plurality of driven wheels for advancing and rotating the stalks.

9. The invention of claim 1 wherein the grading area includes a series of light sensitive photoelectric cells disposed at the surface of the assembly table and a source of light above said surface.

10. The invention of claim 9 wherein the photoelectric cells are positioned relative to the grading area so as to detect and signal the length, thickness and color characteristic measurements of conveyed leaves and solenoid trigger means associated with the gates is responsive to the signals given by said cells to open said gates and dispense said leaves.

11. An apparatus for grading tobacco leaves comprising means for feeding individual tobacco leaves to a roller conveyor, a substantially flat surface associated with said conveyor, said assembly including a grading area and a plurality of normally closed gates on said surface, said grading area including at least one light sensitive selector means for opening a selected one of said gates responsive to the characteristic of each of said leaves measured by said selector means, and collectors disposed below said gates to receive the deposited leaves.

References Cited
UNITED STATES PATENTS

| | | | |
|---|---|---|---|
| 2,415,174 | 2/1947 | Hurley | 209—82.1 |
| 2,574,030 | 11/1951 | Green | 131—131 |
| 2,962,029 | 11/1960 | McCashen | 131—131 |
| 2,989,056 | 6/1961 | Motte | 131—131 |
| 3,069,013 | 12/1962 | Neubrecht et al. | 209—111.6 |
| 3,105,151 | 9/1963 | Nash | 209—111.6 |
| 3,282,419 | 11/1966 | Rock | 209—111.7 |

ALDRICH F. MEDBERY, *Primary Examiner.*